G. F. GODLEY.
Car-Springs.

No. 155,578.   Patented Oct. 6, 1874.

Attest:
Edwin J. McLain.
W. T. Hutchinson

Inventor:
George F. Godley,
by John J. Halsted,
his Atty.

UNITED STATES PATENT OFFICE.

GEORGE F. GODLEY, OF PHILADELPHIA, PENNSYLVANIA.

IMPROVEMENT IN CAR-SPRINGS.

Specification forming part of Letters Patent No. 155,578, dated October 6, 1874; application filed September 21, 1874.

*To all whom it may concern:*

Be it known that I, GEORGE F. GODLEY, of the city and county of Philadelphia and State of Pennsylvania, have invented an Improvement in Car-Springs, of which the following is a specification:

My improvements consist in a special construction of coiled steel spring, having for its object increased strength, greater carrying capacity, and economy of metal; and it consists in making the spring with flat surfaces on the thicker parts, which are liable to come in contact with each other when the spring is compressed, and with a web or webs having a lesser thickness, as hereinafter described; and it also consists in a coiled car-spring having a thin part in cross-section, and coiled with such thin part on the interior of the coil.

Figure 1:
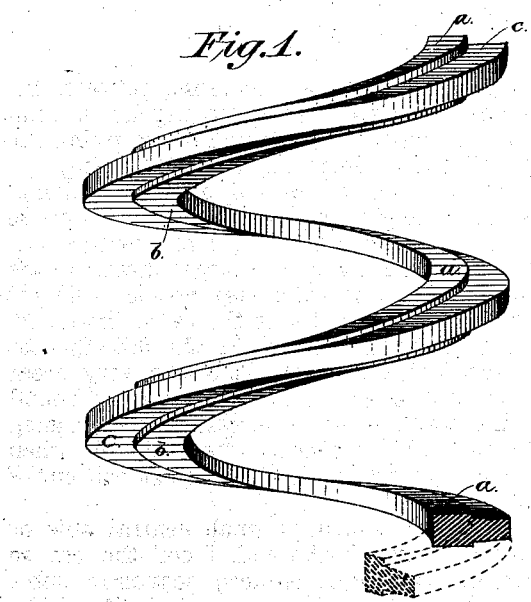
Figure 2:
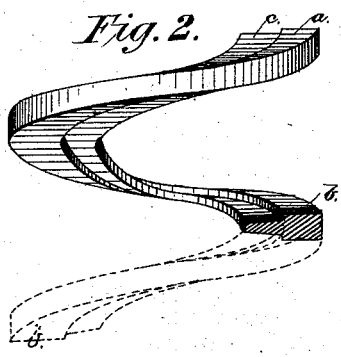

In the drawings accompanying and forming part of this specification, Figure 1 illustrates a spring made in accordance with my invention, the thin or depressed part beyond the flat surfaces being outside. Fig. 2 illustrates a spring made of a bar coiled with the thicker portion on the exterior.

The bar of which the spring is made has, as will be seen, two opposite flat parallel surfaces, *a b*, and extending beyond such flat surfaces a web, *c*, made considerably thinner than the other portion, the cross-section of the bar being of a T form.

When this bar is coiled into a spiral, as shown in Fig. 1, it will be seen that the flat surfaces *a b*, when the spring is compressed to its fullest extent, form a broad bed, each for the other, and thus preserve the integrity of the spring, and prevent lateral strain or pressure of one coil upon another, such lateral pressure being very injurious, and necessarily occurring in springs made of cylindrical bars, or of any other form in cross-section, where a mere line or edge bears upon a similar line or edge. This flat surface is also of great value for the same reason when a spring is coiled in a cone shape, as is frequently the case.

The web *c*, when the spring is tempered, by reason of its thinness, becomes tempered throughout, thus affording the requisite elasticity or resilience; and the thicker portion *a b*, during the same tempering process, becomes surface-tempered, leaving its internal part untempered and tough, thus giving the qualities most desirable in a good spring.

For a bolster or journal, or for equalizing-bars for freight or passenger cars, I propose to coil in a cone shape, for the reason that the base being then of a larger diameter, the spring gives a soft and easy motion to a light or unladen car, while at the same time it secures the advantage due to the flat adjacent surfaces of the coils. This is a very great advantage over a cone-coiled wire or round rod, because in them the gradually-increasing diameter of the cone causes each coil, when under pressure, to force the next coil out of place.

In cases requiring a small central hole or opening through the coil, I coil the bar so that the thinner or reduced portion or web *c* shall be on the inside, as shown in Fig. 2, instead of on the exterior, as in Fig. 1. This also enables me to use a much smaller mandrel, and to make a coil of much less diameter, and without any liability of overtaxing or overstraining the thicker portion, either in the act of coiling, or when the spring is in actual use.

I find that springs made agreeably to my present invention have a carrying capacity of nearly fifty per cent. more than the ordinary springs made of cylindrical rods, and that there is an economy of about twenty-five per cent. in the amount of steel required, besides greater strength and durability. I also find that one of my springs, occupying a given space, gives more strength than the two coils of round rods, one within the other, ordinarily used, and occupying the same space.

Figure 3:
Figure 5:
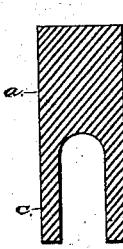
Figure 4:
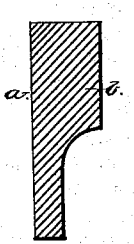

Figs. 3, 4, and 5 show in cross-section modifications of the form of the bar, each, however, having, as will be seen, the features which constitute the essence of my invention—namely, the two opposite flat surfaces, and the projecting thinner portion or web. It will be evident that still other forms may be made without departing from the spirit of the invention, such as an H form, or that the web part may, if desired, have its sides slightly inclined.

I claim—

1. A metal car-spring having flat surfaces *a b*, and and a web or webs, *c* C, having a lesser thickness beyond such surfaces, substantially as shown and described.

2. A spiral metal car-spring, formed of a bar having a part thinner in cross-section than the rest, and coiled with such thin part in the interior of the coil, substantially as and for the purpose set forth.

GEORGE F. GODLEY.

Witnesses:
 GEO. T. SMALLWOOD,
 JOHN J. HALSTED.